(12) United States Patent
Onoda

(10) Patent No.: US 6,527,989 B1
(45) Date of Patent: Mar. 4, 2003

(54) MOLDED CONNECTOR AND METHOD FOR MANUFACTURING MOLDED CONNECTOR

(75) Inventor: Katsuhiko Onoda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/517,449

(22) Filed: Mar. 2, 2000

(30) Foreign Application Priority Data

Mar. 2, 1999 (JP) ............................................. 11-054026

(51) Int. Cl.[7] .......................... B29C 45/14; B29C 70/72
(52) U.S. Cl. .................... 264/40.1; 264/255; 264/263; 264/277; 174/60
(58) Field of Search ............................... 264/250, 255, 264/263, 274, 275, 277, 40.1, 254; 174/59, 60, 110 SR

(56) References Cited

U.S. PATENT DOCUMENTS

| | | | | |
|---|---|---|---|---|
| 4,235,832 A | * | 11/1980 | Leighton | 264/230 |
| 4,398,785 A | | 8/1983 | Hedrick | 339/196 R |
| 4,881,884 A | * | 11/1989 | De'Ath | 249/161 |
| 5,182,032 A | * | 1/1993 | Dickie et al. | 249/91 |
| 5,275,765 A | * | 1/1994 | Go et al. | 264/263 |
| 5,279,030 A | * | 1/1994 | Ito et al. | 29/883 |
| 5,527,502 A | * | 6/1996 | Kiuchi et al. | 264/250 |
| 5,729,898 A | | 3/1998 | Ogawa | 29/883 |
| 5,926,952 A | | 7/1999 | Ito | 29/883 |
| 6,019,928 A | * | 2/2000 | Fujitani et al. | 264/263 |
| 6,071,446 A | * | 6/2000 | O'Brien et al. | 264/261 |

FOREIGN PATENT DOCUMENTS

| | | |
|---|---|---|
| DE | 25 31 765 | 9/1979 |
| DE | 40 13 509 A1 | 10/1991 |
| JP | 8-250193 | 9/1996 |

OTHER PUBLICATIONS

Japanese Abstract No. 07114970, dated May 2, 1995.

* cited by examiner

Primary Examiner—Angela Ortiz
(74) Attorney, Agent, or Firm—Sughrue Mion, PLLC

(57) ABSTRACT

To manufacture a molded connector formed by a primary molding and a secondary molding, a primary molded piece having resin portion integrally formed with terminals and a projection formed on the resin portion is prepared first. The primary molded piece is disposed inside a mold used for the secondary molding such that a distal end of the projection abuts against a part of inner face of the mold. Then resin material is injected into the mold to conduct the secondary molding. The projection of the primary molded piece is deformable in accordance with inspecting pressure of the resin material. After the secondary molded piece is removed from the mold, a shape of the distal end of the projection to judge inferiority of the inspecting pressure of the resin material.

10 Claims, 6 Drawing Sheets

MOLDED CONNECTOR AND METHOD FOR MANUFACTURING MOLDED CONNECTOR

BACKGROUND OF THE INVENTION

The present invention relates to a method of manufacturing a molded connector for forming a molded connector by subjecting a synthetic resin material to secondary molding on the outer sides of a primary molded piece having terminal portions, as well as a primary molded piece for the molded connector.

FIG. 7 shows an example of a related molded connector (see Japanese Patent Publication No. 8-2501 93A).

This molded connector 90 is comprised of a primary molded piece 97 formed by insert-molding terminals 91 through a synthetic resin-made core 92, a soft sealant 93 filled in a recessed portion of the core 92 and adhering to the peripheries of the terminals 91, and a synthetic resin-made connector housing 94 covering the outer sides of the primary molded piece 97. The core 92, the sealant 93, and the connector housing 94 have insulating properties, respectively.

The terminals 91 are arranged in two stages in face-to-face relation, and distal end portions of the terminals 91 are projectingly positioned in connector engaging portions 95 and 96 on both sides of the connector housing 94. For example, a connector portion (not shown) of an apparatus or the like is connected to one connector engaging portion 96, while a connector (not shown) on the wire harness side is engaged with the other connector engaging portion 95. Since the terminals 91 are passed through the sealant 93, the penetration of water or the like from one connector engaging portion 96 to the other connector engaging portion 95 can be prevented.

As for the method of manufacturing this molded connector 90, the plurality of terminals 91 are first insert-molded together with the core 92 which is a synthetic resin material, thereby obtaining the primary molded piece 97. Insulation is provided for the terminals by the core 92, and the positioning of the terminals with respect to each other is effected. Next, the sealant 93 is filled in the recessed portion of the core 92 of the primary molded piece 97. Then, the primary molded piece 97 is set in a mold (not shown), a resin material is injected over the primary molded piece 97 to form the connector housing 94, thereby obtaining the molded connector 90 which is a secondary molded piece.

The reason for performing primary molding (preliminary molding) is to prevent the short-circuiting of the terminals 91 due to the occurrence of the positional offset of the terminals 91 by being pressed by the resin pressure, and partly because the terminals 91 cannot be left exposed since a waterproofing structure is adopted.

However, with the above-described related method of manufacturing a molded connector, there have been apprehensions that the primary molded piece 97 is liable to become deformed (the core 92 becomes soft and is liable to become deformed since molding is effected at a high temperature) by being pressed by the high resin pressure during secondary molding (final molding), and that, particularly in the molded multi-way connector using the multiplicity of terminals 91, short-circuiting can occur due to the offset of the positions of the terminals 91 or the contacting of the terminals, and durability deteriorates due to the occurrence of large stresses and strains in the core 92 of the synthetic resin material, with the result that cracks are liable to occur.

For this reason, molding conditions are determined during secondary molding to position and fix the primary molded piece 97, but much man-hour has been required for the management of the positioning and fixation of the primary molded piece 97, and much inspection man-hour has been required for performing continuity checks for the total number of the terminals to ensure the perfection of production quality.

SUMMARY OF THE INVENTION

In view of the above-described problems, the object of the invention is to provide a method of manufacturing a molded connector and the structure of a primary molded piece which make it possible to easily and reliably inspect an inferiority such as deformation of the primary molded piece during secondary molding.

In order to achieve the above object, according to the present invention, there is provided a method of manufacturing a molded connector formed by a primary molding and a secondary molding, comprising the steps of:

preparing a primary molded piece having resin portion integrally formed with terminals and a projection formed on the resin portion;

disposing the primary molded piece inside a mold used for the secondary molding such that a distal end face of the projection abuts against a part of inner face of the mold;

injecting resin material into the mold to conduct the secondary molding; and removing a formed secondary molded piece from the mold.

The projection is deformable in accordance with inspecting pressure of the resin material.

Preferably, the manufacturing method further comprises inspecting a shape of the distal end face of the projection after the secondary molded piece is removed from the mold to judge inferiority of inspecting pressure of the resin material. Here, it is judged that the injecting pressure is inferior when a cross section area of the inspected distal end face increases in comparison with an initial cross section area thereof at a predetermined rate.

Therefore, for example, as the operator confirms the shape of the distal end face of the deformable portion, it is possible to easily and reliably detect an inferiority in the resin pressure and deformation of the primary molded piece. Thus, since an inferiority such as the positional offset of the terminal portions of the primary molded piece and cracks in the resin portion can be easily and reliably detected, it is possible to reduce the man-hour required in the management of the positioning and fixation of the primary molded piece and to detect an inferiority without resorting to the continuity check of the terminal portions. In addition, it is also possible to detect even slight inclination of the terminal portions, so that inspection accuracy improves.

Preferably, a gate for injecting the resin material is provided on a line extending along and through the projection.

Accordingly, since the pressing force based on the resin material injected from the gate is directly transmitted to the projection, the sensing accuracy of the deformable portion is enhanced, and the deformable portion reliably undergoes crushing deformation even with respect to slight abnormal pressure, thereby making it possible to more reliably detect an inferiority such as the deformation of the primary molded piece.

Preferably, the mold has a positioning member for supporting the resin portion when the primary molded piece is disposed therein. The primary molded piece includes an engagement member for engaging with the positioning member.

Accordingly, the primary molded piece is stably supported by the positioning member and the projection, so that the positioning and fixing accuracy of the primary molded piece inside the mold is enhanced.

Preferably, the positioning member extends perpendicular to an extending direction of the projection of the primary molded piece.

Accordingly, the primary molded piece can be supported from two-dimensional directions by the positioning member and the projection, so that the positioning and fixing accuracy of the primary molded piece is further enhanced.

Preferably, the projection is rib-like member longitudinal direction of which is perpendicular to an extending direction of the terminals.

Accordingly, as the elongated rib member undergoes crushing deformation, the distal end face of the rib member is expanded in its widthwise direction, so that the operator and a camera of an automated machine is able to easily detect the deformation of the distal end face, thereby rendering the inspection easier and more reliable.

DETAILED DESCRIPTION OF THE PREFERRED EMBODIMENTS

Figure 1:
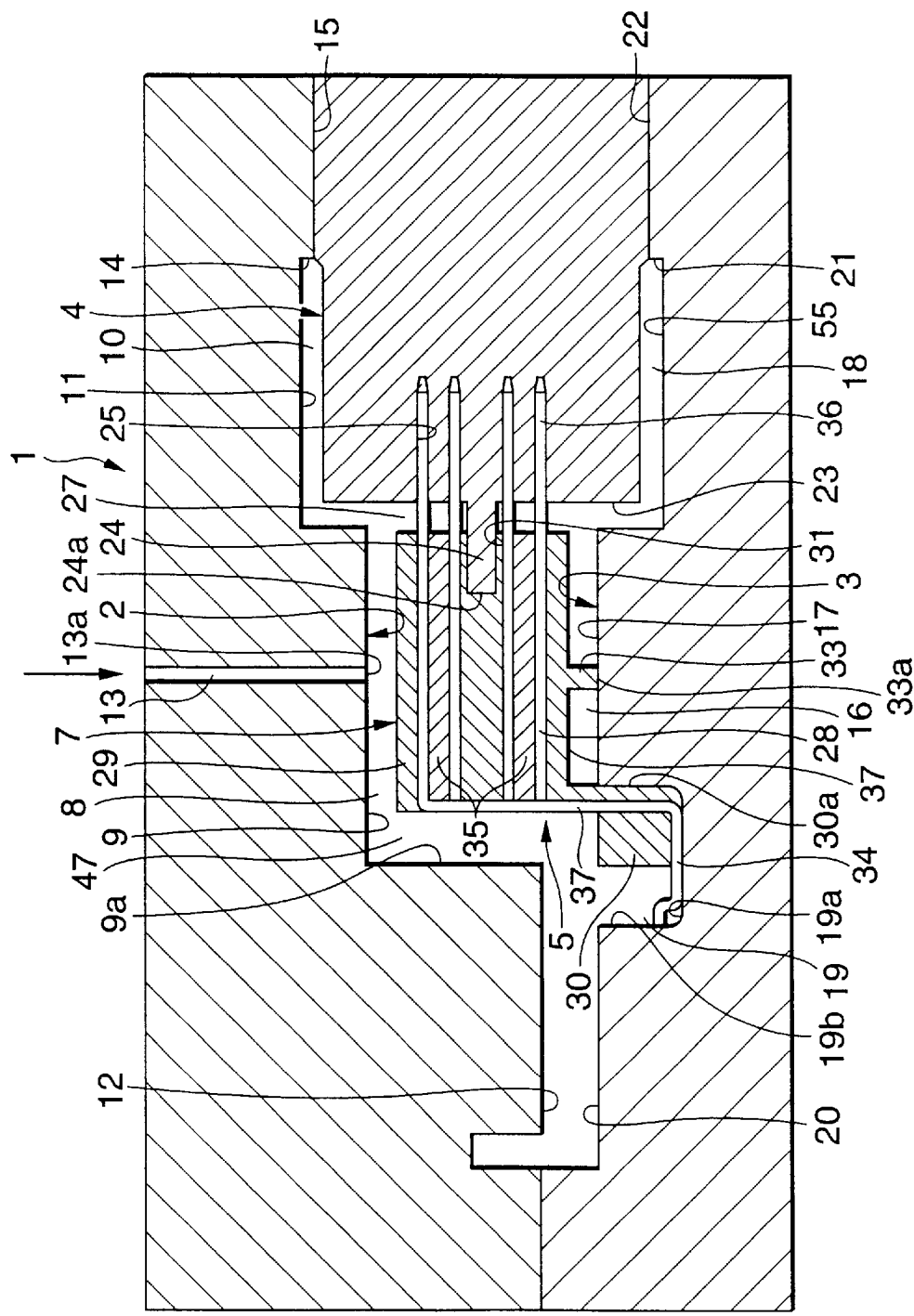
FIG. 1 is a vertical cross-sectional view showing a secondary molding process in the method of manufacturing a molded connector according to one embodiment of the present invention.

Referring now to the drawings, a detailed description will be given of preferred embodiments of the invention.

FIGS. 1 to 4 show one embodiment of the method of manufacturing a molded connector.

In FIG. 1, reference numeral I denotes a molding tool (mold) for forming a molded multi-way connector 6 (FIG. 4) by secondary molding, and the molding tool 1 is comprised of an upper mold block 2, a lower mold block 3, and a lateral mold block 4. A primary molded piece 5 of the molded multi-way connector 6 (FIG. 4) is set in the molding tool 1.

The upper mold block 2 is formed by an intermediate portion (intermediate molding portion) 9 with a large step for accommodating a substantially rectangular block-shaped resin portion 7 of the primary molded piece 5, the intermediate portion 9 being located with a gap 8 on the outer side of the resin portion 7; a front portion (housing molding portion) 11 continuing in the forward direction from the intermediate portion 9 and having a vacant chamber 10 larger than the intermediate portion 9, the lateral mold block 4 being accommodated in the vacant chamber 10 and a gap (substituted by numeral 10) being formed between the same and the lateral mold block 4; and a rear portion (flange molding portion) 12 continuing flatly in the rearward direction from a stepped portion 9a of the intermediate portion 9. A gate 13 for injecting a resin material is provided substantially in the center of the intermediate portion 9. A small stepped portion 14 is formed on the front end side of the front portion 11 in such a manner as to project inwardly, and a surface 15 continuing from the stepped portion 14 is in contact with the lateral mold block 4.

The lower mold block 3 is formed by an intermediate portion (intermediate molding portion) 17 located with a gap 16 between the same and the resin portion 7 of the primary molded piece 5 and having a substantially gibbous shape in its vertical cross section; a front portion (housing molding portion) 55 continuing in the forward direction from the intermediate portion 17 and communicating with the vacant chamber 10, a gap 18 being formed between the same and the lateral mold block 4; and a rear portion (flange molding portion) 20 continuing in the rearward direction from the intermediate portion 17 and continuing flatly through a U-shaped groove portion 19. A surface 22 continuing from a stepped portion 21 formed on the front end side of the front portion 55 in such a manner as to project inwardly is in contact with the lateral mold block 4.

The lateral mold block 4 is formed in the shape of a substantially rectangular block, has at the center of its distal end face 23 a horizontally projecting pin portion (positioning and fixing portion) 24 made of a metal, and has therein terminal inserting holes 25 extending in the axial direction from the distal end face 23. The pin portion 24 is formed of, for example, a metal material integral with the lateral mold block 4 into a horizontal and flat rib shape, and is located in such a manner as to project in such a manner as to oppose the respective intermediate portions 9 and 17 of the upper mold block 2 and the lower mold block 3. A housing portion 26 of the secondary molded piece 6 (FIG. 4) is formed in the gap 10 between the lateral mold block 4 and the upper mold block 2 and in the gap 18 between the lateral mold block 4 and the lower mold block 3. The lateral mold block 4 is capable of advancing and retracting in the horizontal direction along the surfaces 15 and 22 at the front end sides of the upper mold block 2 and the lower mold block 3. A gap 27 is formed between the front end face 23 of the lateral mold block 4 and the resin portion 7 of the primary molded piece 5.

The pin portion 24 is inserted or fitted into the interior of the resin portion 7, thereby effecting the positioning and fixation of the primary molded piece 5 in its vertical, longitudinal, and transverse directions. The pin portion 24 is not limited to the rib shape, and may be a pair of left and right cylindrical shapes.

The primary molded piece 5 includes the substantially rectangular resin portion 7 and a plurality of (a multiplicity of) bus bars 28 which are insert-molded in the resin portion 7. The resin portion 7 is formed by a substantially rectangular main body portion 29 and a sub body portion 30 projecting downward from a rear portion of the main body portion 29. An engaging hole (engaging groove) 31 for the pin portion 24 of the lateral mold block 4 is provided horizontally in the center of the front end of the main body portion 29. The pin portion 24 is fitted in the engaging hole 31 without clearance, and a distal end 24a of the pin portion 24 abuts against the bottom surface of the engaging hole 31, thereby positioning and fixing the primary molded piece 5 in the vertical, transverse, and longitudinal directions.

In addition, a rib (deformable portion) 33 for both deformation detection and positioning is provided in such a manner as to project downward from a lower surface 32 of the main body portion 29, and a distal end 33a of the rib 33 abuts against the upper surface of the intermediate portion 17 of the lower mold block 3, thereby positioning the primary molded piece 5 in the vertical direction. The rib 33 is formed integrally with the main body portion 29. The rib 33 projects vertically, and is positioned in a direction perpendicular to the pin portion 24. The position of the pin portion 24 is set in a position symmetrical with the position of the gate 13 of the upper mold block 2, i.e., in such a position that if a vertical line is drawn from the center of an opening 13a of the gate 13, the vertical line passes the center of the rib 33. The primary molded piece 5 is reliably positioned and fixed in the three-dimensional directions, i.e., in the longitudinal, vertical, and transverse directions, by the pin portion 24 and the rib 33.

In addition, the sub body portion 30 is accommodated in the U-shaped groove portion 19 of the lower mold block 3, the lower end of the sub body portion 30 abuts against a bottom surface 19a of the U-shaped groove portion 19, and a front end 30a of the sub body portion 30 abuts against the front end surface of the U-shaped groove portion 19, thereby supporting the primary molded piece 5 together with the pin portion 24 and the rib 33. Contact portions 34 of the bus bars 28 are located in such a manner as to be exposed at the lower end of the sub body portion 30, the contact portions 34 are slightly extended rearward, and the distal ends of the contact portions 34 abut against a rear end surface 19b of the U-shaped groove portion 19. This also supports the primary molded piece 5 in a stable manner.

The main body portion 29 may be molded of one kind of resin material; however, in this example, the bus bars 28 are retained and fixed in advance by a pair of upper and lower holders 35 made of a synthetic resin, and in that state a resin material is molded over the holder 35, thereby obtaining the primary molded piece 5. The bus bars 28 are fixed to the upper and lower surfaces of both holders 35, and are thereby arranged in four stages. The engaging hole 31 for insertion of the pin portion 24 is provided in the main body portion 29 between the upper and lower holders 35.

Figure 7:
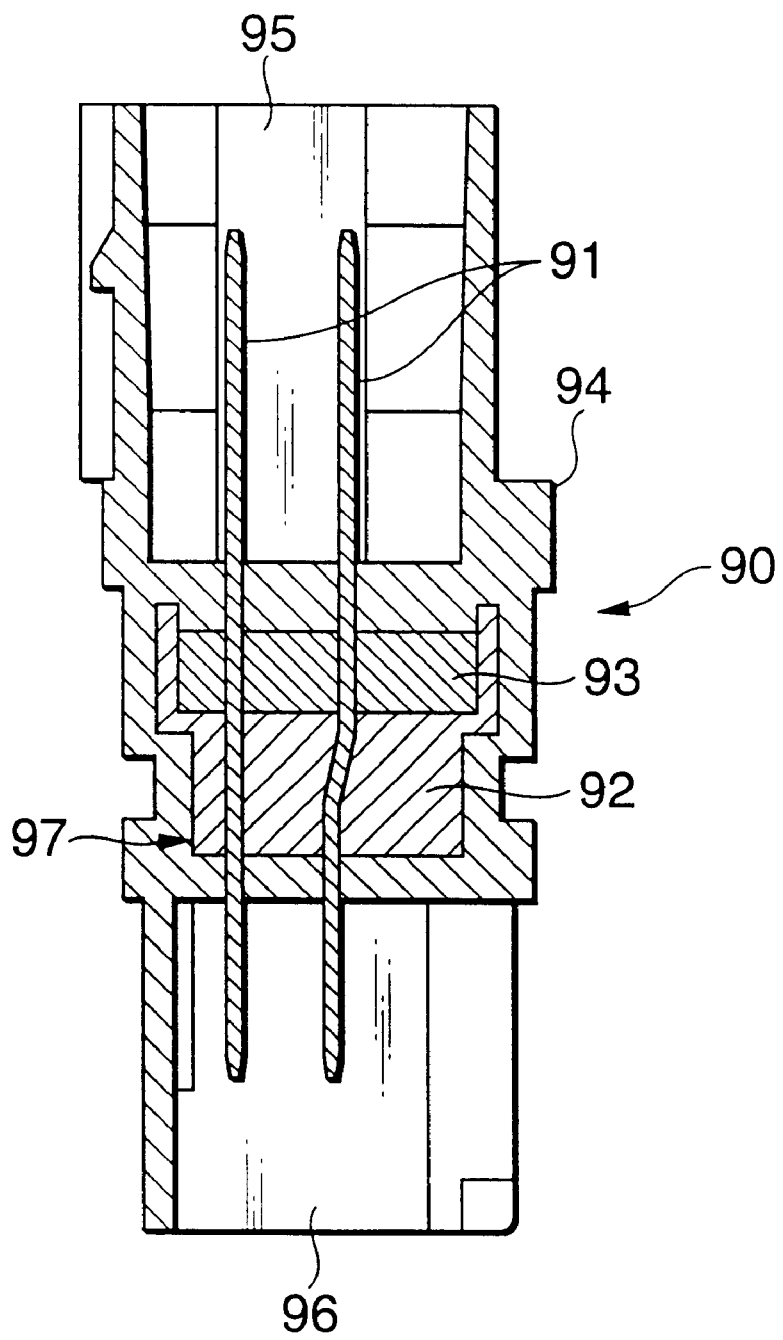
FIG. 7 is a vertical cross-sectional view showing a related molded connector.

The bus bars 28 have pin-shaped terminal portions 36 on their front end sides, and have the contact portions 34 on their rear end sides. Leading portions 37 of the bus bars 28 on their rear end sides are bent along the rear end of the main body portion 29, and continue to the contact portions 34. The bus bars 28 may be directly insert-molded in the resin portion 7 without using the holders 35 as in the related art shown in FIG. 7.

Figure 2:
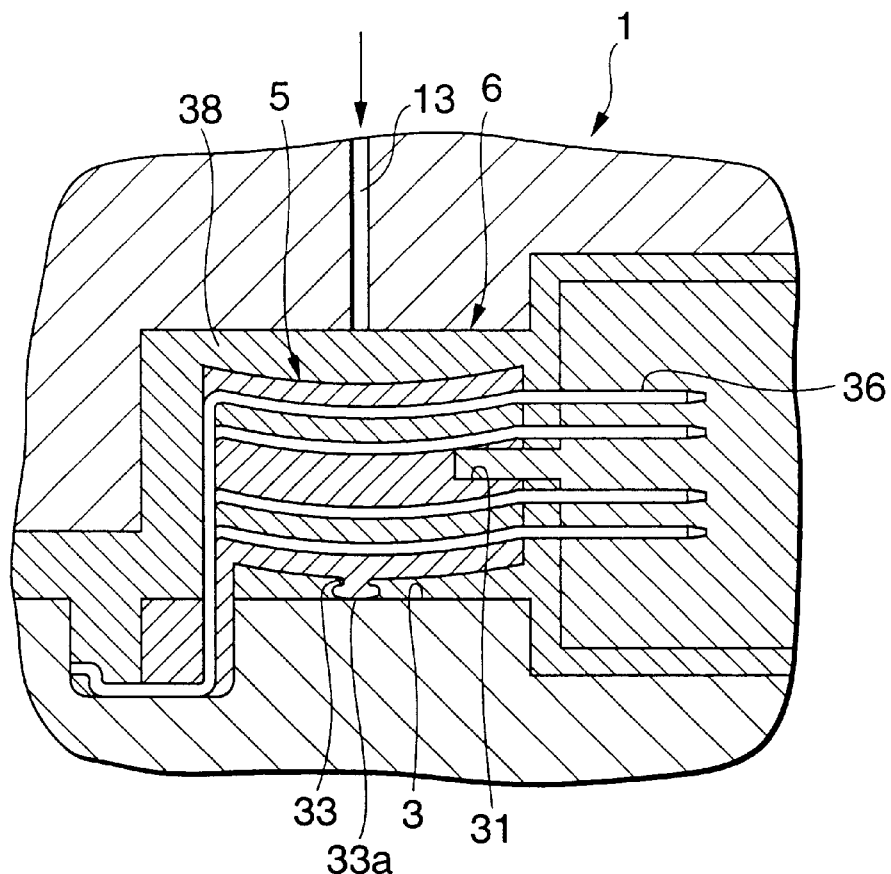
FIG. 2 is a vertical cross-sectional view showing a deformation inferiority in the primary molded piece during secondary molding.

In FIG. 1, a resin material is injected from the gate 13 of the upper mold block 2. The resin material is filled into each gap formed between the primary molded piece 5, on the one hand, and the lateral mold block 4, the upper mold block 2, and the lower mold block 3, on the other. Here, in the event that the pressure with which the resin material is injected is too strong, and the primary molded piece 5 is pushed downward and is bent and deformed as shown in FIG. 2, the rib 33 is compressed and crushed between the lower surface 32 of the main body portion 29 and the lower mold block 3, and the shape of the distal end face 33a of the rib 33 expands from the normal elongated state shown in FIG. 3A to the elliptical shape shown in FIG. 3B. In this state, a resin material 38 (FIG. 2) on the outer side hardens, and the shape of the distal end of the rib 33 remains in the elliptically expanded state. Accordingly, when the operator has removed the secondary molded piece 6 from the molding tool 1, the operator is able to easily confirm the presence or absence of the deformation of the primary molded piece 5 by viewing the shape of the distal end of the rib 33.

Figure 3A:
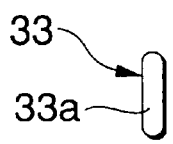
FIG. 3A is a plan view showing the initial shape of a detecting rib which is a deformable portion.
Figure 3B:
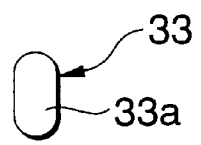
FIG. 3B is similarly a plan view showing a deformed state of the rib.

Since the rib 33 is located immediately below the gate 13 (symmetrically with the gate 13), the rib 33 reacts sensitively to the pressure inferiority in the resin material 38. Although the rib 33 is capable of reacting to the pressure inferiority and undergoing crushing deformation even if the rib 33 is not located immediately below the gate 13, the above configuration may detects the pressure inferiority most sensitively. The shape of the rib 33 is not limited to the elongated one, and even if the distal end is a square one, it is possible to visually confirm the deformation caused during crushing (the distal end face becomes somewhat round). By forming the rib 33 in the elongated shape as shown in FIG. 3A, it is possible to easily detect the change in the distal end face 33a. The fact that the elongated rib 33 is liable to be affected by heat during secondary molding and is liable to deform by abnormal pressure is also a suitable factor as a detecting member.

Figure 4:
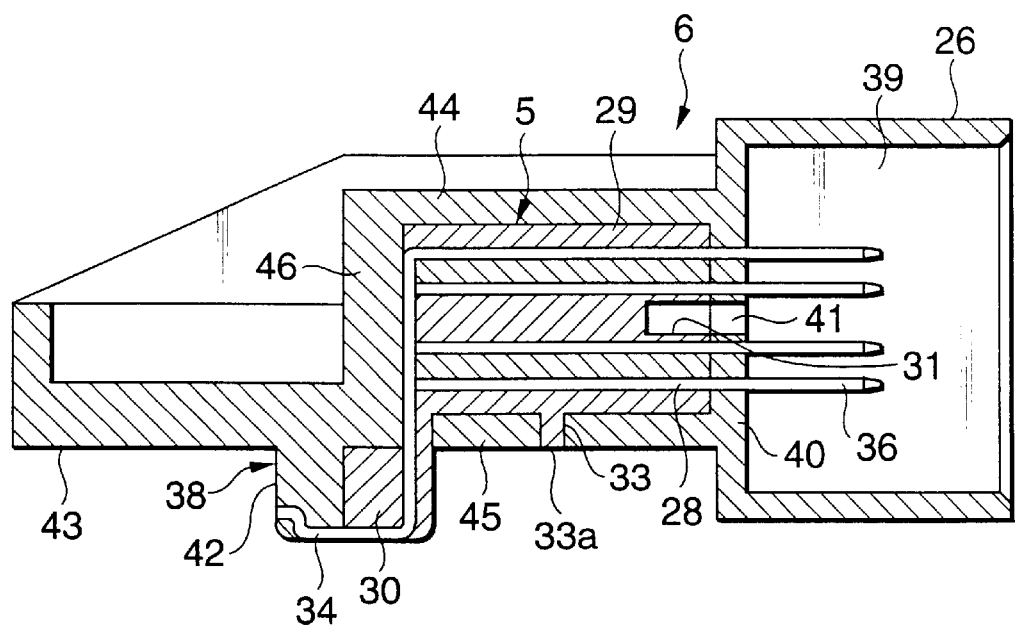
FIG. 4 is a vertical cross-sectional view showing a molded multi-way connector which is a secondary molded piece.

In FIG. 1, if the resin material for secondary molding is injected properly, the resin material 38 is formed on the outer side of the main body portion 29 with uniform thickness' for the upper and lower portions without the deformation of the primary molded piece 5 and the rib 33, as shown in FIG. 4. In the state in which the lateral mold block 4 (FIG. 1) is removed, the housing portion 26 is formed, and the terminal portions 36 of the bus bars 28 are positioned in such a manner as to project into a connector engaging chamber 39 of the housing portion 26. Engaging holes 41 and 31 for the pin portion 24 (FIG. 1) remain open in a bottom wall 40 of the connector engaging chamber 39 and in the main body portion 29 of the primary molded piece 6, respectively.

The terminal portions 36 of the bus bars 28 are positioned in such a manner as to project into the connector engaging chamber 39 of the housing portion 26, and the contact portions 34 in the rear are positioned in such a manner as to be exposed at a distal end of a connector portion 42. The resin material 38 is integrated with the rear portion of the sub body portion 30 of the primary molded piece 5 by secondary molding, thereby forming the connector portion 42. The connector portion 42 is positioned in such a manner as to project from a flange portion 43.

The flange portion 43 is formed by the rear portions (flange molding portions) 12 and 20 of the molding tool 1 shown in FIG. 1. The connector portion 42 is formed by the U-shaped groove portion 19. Upper, lower, left, right, and rear wall portions 44 to 46 on the outer sides of the main body portion 29 of the primary molded piece 5 shown in FIG. 4 are formed by the gaps 8, 16, and 47 in the intermediate portions 9 and 17 (FIG. 1). The housing portion 26 and the bottom wall 40 are formed by the gaps 10, 18, and 27 in the front portions (housing molding portions) 11 and 55.

Figure 5:
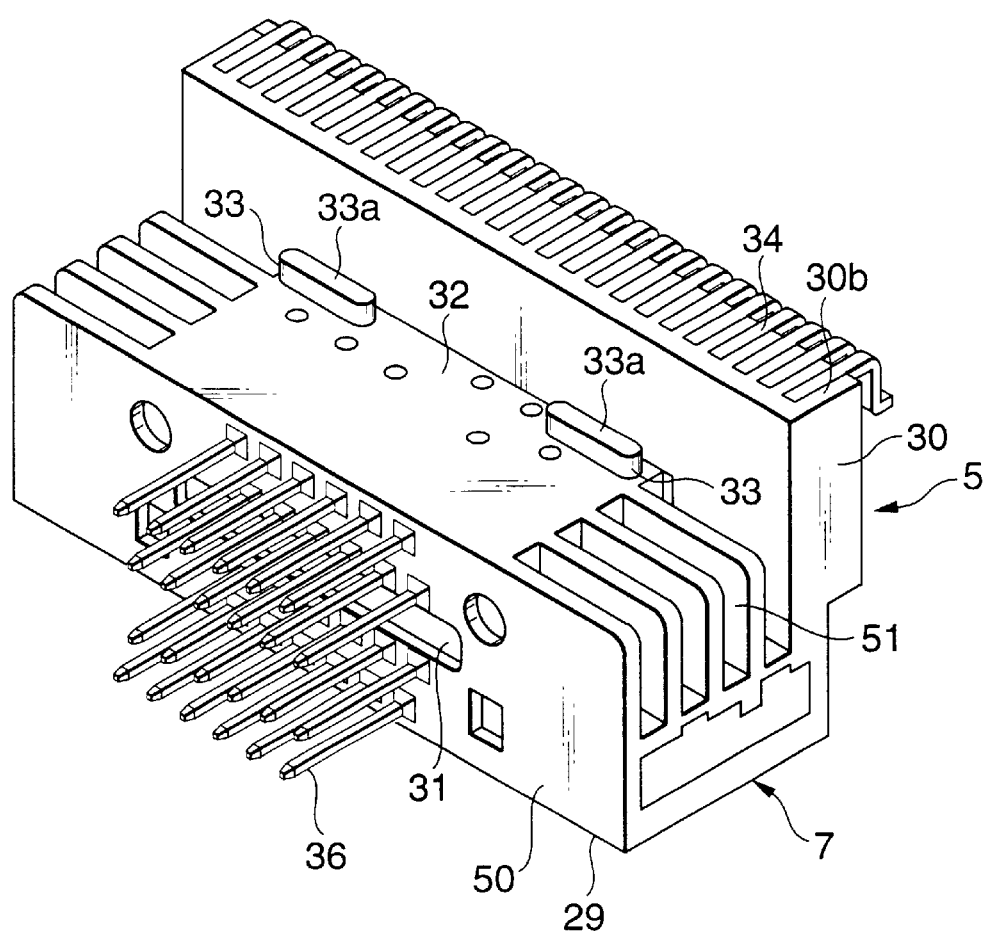
FIG. 5 is a perspective view showing a detailed example of the primary molded piece.
Figure 6:
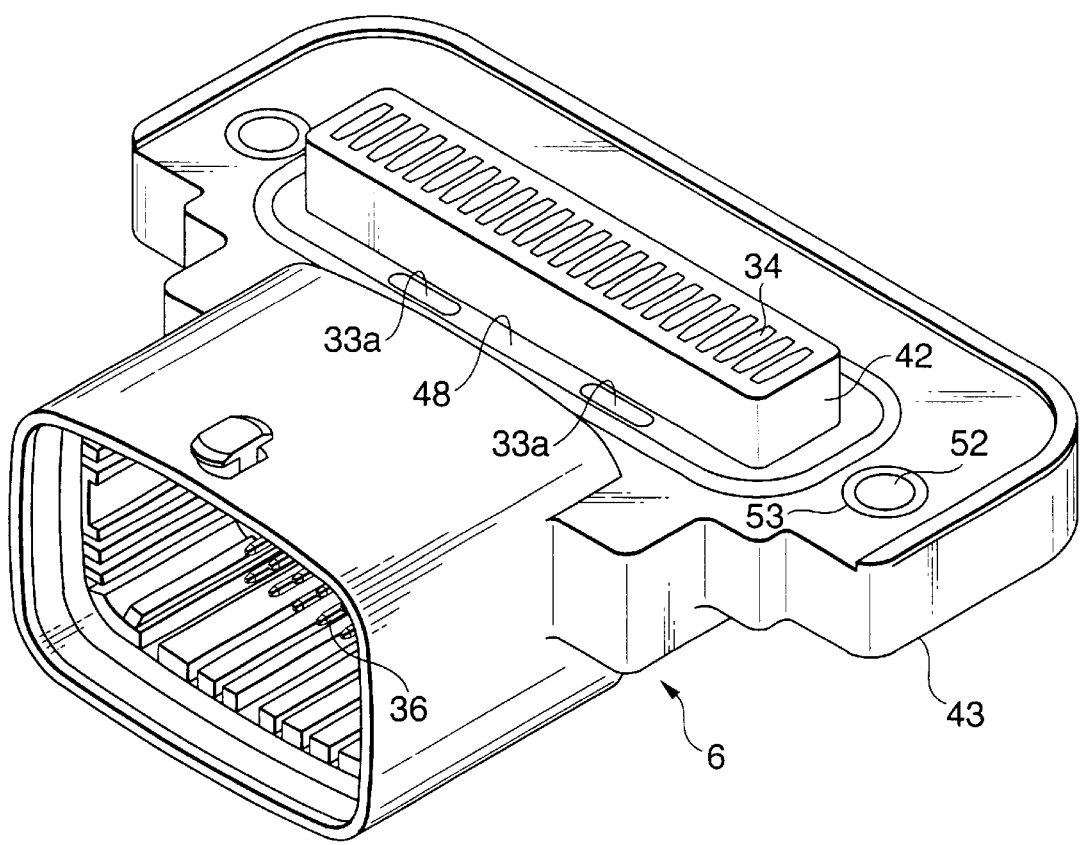
FIG. 6 is a perspective view showing a detailed example of the molded multi-way connector which is the secondary molded piece.

FIG. 5 shows a detailed example of the primary molded piece, and FIG. 6 shows a detailed example of the secondary molded piece (molded multi-way connector) formed by using that primary molded piece. Although these examples slightly differ from the structures shown in FIGS. 1 to 4, a description will be given by using the same reference numerals for convenience sake. FIGS. 5 and 6 respectively show states in which the primary molded piece and the secondary molded piece shown in FIGS. 1 and 4 are inverted.

In the primary molded piece 5 in FIG. 5, reference numeral 7 denotes the resin portion, 29 denotes its main body portion, and 30 denotes its sub body portion. A pair of left and right ribs (deformable portions) 33 are provided projectingly on one wall surface 32 of the main body portion 29, which is parallel to the terminal portions 36. The ribs 33 extend in an elongated manner in a direction perpendicular to the projecting direction of the terminal portions 36. The reason for the fact that the ribs 33 are extended in the lateral direction is to stably effect the three-point support by the ribs 33, the pin portion (positioning and fixing portion) 24, and the sub body portion 30 in FIG. 1, and also to allow the distal end faces 33a of the ribs 33 in the secondary molded piece 6 in FIG. 6 to stably come into contact with the unillustrated apparatus side (if the ribs 33 are elongated in the projecting direction of the terminal portions 36, the ribs 33 overlap with a protrusion 48 of the flange portion 43 in FIG. 6, and the inspection is difficult).

In FIG. 5, the ribs 33 are disposed close to the sub body portion 30 (close to the rear end of the wall surface 32), and the distance between the ribs 33 and the engaging hole 31 in a front end wall (front end face) 50 of the main body portion 29 is set to be long. As a result, when the resin material is injected in the state shown in FIG. 1, the primary molded piece 5 in FIG. 5 tends to rotate downward with the pin portion 24 (FIG. 1) as a fulcrum, so that a large force is applied to the ribs 33 through the principle of the lever, thereby allowing the ribs 33 to reacting sensitively to the pressure inferiority in the resin material.

In FIG. 5, the laterally elongated engaging hole 31 is provided in the center of the front end wall 50. The laterally elongated engaging hole 31 corresponds to the laterally elongated pin portion 24, but both end portions of the engaging hole 31 may be received by a pair of cylindrical pin portions (not shown). The terminal portions 36 are arranged in multiple stages above and below the engaging hole 31. Grooves 51 for charting the resin are deeply formed in both sides of the main body portion 29 to improve the engageability with the resin material 38 during secondary molding. The contact portions 34 are positioned in parallel in such a manner as to be exposed at a distal end face 30b of the sub body portion 30.

In the secondary molded piece (molded multi-way connector) shown in FIG. 6, the distal end faces 33a of the ribs 33 (FIG. 5) are positioned in such a manner as to be exposed at the surface of the flange portion 43, as described above. In this state, the shape of the distal end faces 33a of the ribs 33 is confirmed visually or by a camera or the like of an automated machine. If the distal end faces 33a of the ribs 33 are different from the desired shape, it means that an inferiority of positional offset has occurred in the primary molded piece 5 due to such as the pressure inferiority or dislocation from the pin portion 24 (FIG. 1) during secondary molding.

A pair of bushes 53 each having a mounting hole 52 are formed integrally with the flange portion 43, and when the flange portion 78, for instance, is mounted directly on an apparatus, the distal end faces 33a of the ribs 33 serve as contact surfaces with respect to the apparatus side. The resin material 38 (FIG. 4) is molded around a latter half of the sub body portion 30 shown in FIG. 5 by secondary molding to form the connector portion 42, which is positioned in such a manner as to project from the flange portion 43, and electrical connection is established with the apparatus side through the contact portions 34.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A method of manufacturing a molded connector formed by a primary molding and a secondary molding, comprising the steps of:

preparing a primary molded piece having a resin portion integrally formed with terminals and a projection formed on the resin portion;

disposing the primary molded piece inside a mold used for the secondary molding such that a distal end face of the projection abuts against a part of the inner face of the mold;

injecting resin material into the mold to conduct the secondary molding;

removing a formed secondary piece from the mold;

wherein a gate for injecting the resin material is provided at a line extending along and through the projection, and wherein the projection is a rib member and is deformable in accordance with an injecting pressure of the resin material.

2. The manufacturing method as set forth in claim 1, wherein the mold has a positioning member for supporting the resin portion when the primary molded piece is disposed therein.

3. The manufacturing method as set forth in claim 2, wherein the positioning member extends perpendicular to an extending direction of the projection of the primary molded piece.

4. The manufacturing method as set forth in claim 1, further comprising: inspecting a shape of the distal end face of the projection after the secondary molded piece is removed from the mold to judge inferiority of injecting pressure of the resin material.

5. A method of manufacturing a molded connector formed by a primary molding and a secondary molding, comprising the steps of:

preparing a primary molded piece having a resin portion integrally formed with terminals and a projection formed on the resin portion;

disposing the primary molded piece inside a mold used for the secondary molding such that a distal end face of the projection abuts against a part of the inner face of the mold;

injecting resin material into the mold to conduct the secondary molding;

removing a formed secondary piece from the mold; and inspecting a shape of the distal end face of the projection after the secondary molded piece is removed from the mold to judge inferiority of injecting pressure of the resin material;

wherein a gate for injecting the resin material is provided at a line extending along and through the projection, and, wherein it is judged that the injecting pressure is inferior when a cross section area of the inspected distal end face increases in comparison with an initial cross section are thereof at a predetermined rate.

6. A molded connector formed by a primary molding and a secondary molding, wherein the molded connector is manufactured by a method comprising the steps of:

preparing a primary molded piece having a resin portion integrally formed with terminals and a projection formed on the resin portion;

disposing the primary molded piece inside a mold used for the secondary molding such that a distal end face of the projection abuts against a part of the inner face of the mold;

injecting resin material into the mold to conduct the secondary molding; and removing a formed secondary piece from the mold;

wherein a gate for injecting the resin material is provided at a line extending along and through the projection, and wherein the projection is deformable in accordance with an injecting pressure of the resin material.

7. The molded connector as set forth in claim 6, wherein the projection is a rib member, a longitudinal direction of which is perpendicular to an extending direction of the terminals.

8. A molded connector formed by a primary molding and a secondary molding, wherein the molded connector is manufactured by a method comprising the steps of:

preparing a primary molded piece having a resin portion integrally formed with terminals and a projection formed on the resin portion;

disposing the primary molded piece inside a mold used for the secondary molding such that a distal end face of the projection abuts against a part of the inner face of the mold;

injecting resin material into the mold to conduct the secondary molding; and removing a formed secondary piece from the mold;

wherein a gate for injecting the resin material is provided at a line extending along and through the projection, wherein the mold has a positioning member for supporting the resin portion when the primary molded piece is disposed therein, wherein the projection is deformable in accordance with injecting pressure of the resin material, and wherein the primary molded piece includes an engagement member for engaging with the positioning member formed on the mold.

9. The molded connector, as set forth in claim 8, wherein the projection is a rib member, the longitudinal direction of which is perpendicular to an extending direction of the terminals.

10. A method of manufacturing a molded connector formed by a primary molding and a secondary molding, comprising the steps of:

preparing a primary molded piece having resin portion integrally formed with terminals and a projection formed on the resin portion;

disposing the primary molded piece inside a mold used for the secondary molding such that a distal end face of the projection abuts against a part of inner face of the mold;

injecting resin material into the mold to conduct the secondary molding; removing a formed secondary piece from the mold; and inspecting a shape of the distal end face of the projection after the secondary molded piece is removed from the mold to judge inferiority of injecting pressure of the resin material, wherein it is judged that the injecting pressure is inferior when a cross section area of the inspected distal end face increases in comparison with an initial cross section area thereof at a predetermined rate.

* * * * *